United States Patent
Chen et al.

(10) Patent No.: US 11,535,718 B2
(45) Date of Patent: Dec. 27, 2022

(54) METHOD FOR PREPARING COLOR MASTERBATCH WITH NATURAL DYE

(71) Applicant: CHANGZHOU UNIVERSITY, Changzhou (CN)

(72) Inventors: Qun Chen, Changzhou (CN); Yonggang Peng, Changzhou (CN); Junling Ji, Changzhou (CN); Haiqun Chen, Changzhou (CN); Yuan Wang, Changzhou (CN); Junjie Tan, Changzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 65 days.

(21) Appl. No.: 17/294,702

(22) PCT Filed: Oct. 14, 2020

(86) PCT No.: PCT/CN2020/120739
§ 371 (c)(1),
(2) Date: May 18, 2021

(87) PCT Pub. No.: WO2022/032852
PCT Pub. Date: Feb. 17, 2022

(65) Prior Publication Data
US 2022/0306819 A1    Sep. 29, 2022

(30) Foreign Application Priority Data
Aug. 11, 2020  (CN) .......................... 202010798857.8

(51) Int. Cl.
| | | |
|---|---|---|
| *C08J 3/22* | (2006.01) |
| *C08J 3/12* | (2006.01) |
| *D01F 6/92* | (2006.01) |
| *D01F 1/06* | (2006.01) |

(52) U.S. Cl.
CPC ............... *C08J 3/226* (2013.01); *C08J 3/126* (2013.01); *D01F 1/06* (2013.01); *D01F 6/92* (2013.01)

(58) Field of Classification Search
CPC ... C08J 3/126; C08J 3/226; D01F 1/06; D01F 6/92
See application file for complete search history.

(56) References Cited

U.S. PATENT DOCUMENTS 8,349,452 B2 *  1/2013  Jung ...................... C09K 5/063
                                                      264/4.1

FOREIGN PATENT DOCUMENTS

| | | |
|---|---|---|
| CN | 102066498 A | 5/2011 |
| CN | 109337194 A | 2/2019 |
| KR | 20200061023 A | 6/2020 |
| WO | 2008058868 A1 | 5/2008 |

* cited by examiner

*Primary Examiner* — Edward J Cain
(74) *Attorney, Agent, or Firm* — Bayramoglu Law Offices LLC

(57) ABSTRACT

A method for preparing a color masterbatch with a natural dye is disclosed. The new method uses a phase change material tetradecane as one of the solvents to extract the natural dye, the extracted natural dye as a core material, and polybutylene succinate as a wall material to microencapsulate the natural dye containing the phase change material by a solvent evaporation method to prepare natural dye microcapsules, then melt-blends with a carrier resin, extrudes and granulates to obtain the color masterbatch with the natural dye. The microencapsulation improves the thermal stability of natural dye and compatibility with carrier resin The obtained color masterbatch with natural dye has excellent heat resistance, and the fabric obtained after spinning with it has good color fastness to hot pressing.

9 Claims, No Drawings

METHOD FOR PREPARING COLOR MASTERBATCH WITH NATURAL DYE

CROSS REFERENCE TO THE RELATED APPLICATIONS

This application is the national phase entry of International Application No. PCT/CN2020/120739, filed on Oct. 14, 2020, which is based upon and claims priority to Chinese Patent Application No. 202010798857.8, filed on Aug. 11, 2020, the entire contents of which are incorporated herein by reference.

TECHNICAL FIELD

The present invention belongs to the field of new materials, and particularly to a method for preparing a color masterbatch with a natural dye.

BACKGROUND

Natural dyes extracted from nature are environmentally friendly, non-toxic, harmless, biodegradable, and many of them have antibacterial, anti-inflammatory, anti-ultraviolet and other functions, which are widely used in the fields of textile, cosmetics, medicine and healthcare. In the field of textile and clothing, natural dyes can be used to dye synthetic fibers, but there is often a problem of poor color fastness. When natural dyes are made into a color masterbatch, which is then added in the spinning process, colored fibers with excellent color fastness can be obtained. However, its heat resistance has always been a bottleneck in the preparation of colored fibers by melt spinning.

SUMMARY

The technical problems to be solved by the present invention are to overcome the problem that the existing natural dyes have poor thermal stability and cannot be directly used for synthetic fiber melt spinning, and to provide a method for preparing a color masterbatch with a natural dye.

In order to solve the above technical problems, the technical solution adopted by the present invention is as follows. A method for preparing a color masterbatch with a natural dye, firstly, taking a mixed solution of a phase change material tetradecane and ethanol as a solvent to extract the natural dye, removing the ethanol by rotary evaporation, taking the ethanol-free mixture as a core material and polybutylene succinate as a wall material to prepare natural dye/tetradecane microcapsules by a solvent evaporation method; and taking the natural dye/tetradecane microcapsules as a dyeing component of the color masterbatch, melt-blending with a carrier resin, extruding and granulating.

The method for preparing the color masterbatch with the natural dye includes the following steps.

(1) Removing impurities of a natural plant raw material, cleaning, drying the raw material in the air, crushing into 80-200 mesh, and soaking in a mixed solvent of tetradecane and ethanol for 1-2 h, extracting under a reflux at 60-100° C. for 0.5-2 h and filtering, extracting 3-5 times repeatedly, combining the extracted solutions obtained from multiple times of extraction to obtain a natural dye stock solution; removing the ethanol by decompression distillation to obtain a natural dye/tetradecane solution.

The natural plant raw material is one selected from the group consisting of rhubarb, turmeric, red pepper, camphor leaves, madder, and vervain, and a volume ratio of the tetradecane to the ethanol is 1:5-2:5.

(2) Dissolving polybutylene succinate into 100 mL chloroform, adding the natural dye/tetradecane solution obtained in step (1), stirring at a high speed, and mixing uniformly to obtain a chloroform solution of polybutylene succinate containing natural dye.

A mass ratio of the natural dye/tetradecane solution to the polybutylene succinate is 3:1-5:1.

(3) Adding 100 mL deionized water, Arabic gum and sodium dodecylbenzene sulfonate into a 250 mL three-port flask, fully stirring and dissolving; adding the chloroform solution of polybutylene succinate containing natural dye obtained in step (2) into the three-port flask, slowly raising a temperature to 40-50° C., condensing and recovering steam, keeping at this temperature for 4-6 h, forming microcapsules by the gradual solidification of the polybutylene succinate caused by the evaporation of chloroform, collecting solids, fully cleaning with deionized water and drying to obtain natural dye/tetradecane microcapsules.

A mass ratio of the Arabic gum and the sodium dodecylbenzene sulfonate is 1:3-1:6, and a total mass of the Arabic gum and the sodium dodecylbenzene sulfonate accounts for 2%-4% of a total mass of the system.

(4) Adding 10-25 parts by weight of the natural dye/tetradecane microcapsules, 0.5-1.5 parts by weight of an antioxidant and 70-90 parts by weight of a carrier resin to a high-speed mixer with a rotation speed of 500-1,500 rpm, mixing at 1550-150° C. for 10-30 min, and adding the well-mixed material into a twin-screw extruder for melt blending, extrusion and granulation, in which screw temperatures are set as follows: 200-250° C. in a first zone, 230-255° C. in a second zone, 220-260° C. in a third zone, 220-260° C., in a fourth zone, 220-260° C. in a fifth zone and 220-260° C. in a sixth zone; after cooling with 25-30° C. water, pelletizing, and drying at 80-100° C.

The antioxidant is antioxidant 1010, and the carrier resin is ethylene terephthalate.

It can be seen from the above technical solution that: firstly, the fat-soluble pigment in the plant raw material is extracted by the mixed solvent of phase change material tetradecane and ethanol, and the ethanol in the extracted solution is removed by rotary evaporation; then, the tetradecane and natural pigment are coated with polybutylene succinate as the wall material to improve the heat resistance/thermal stability of natural pigment; the coating of the polyester material improves the compatibility of the core material and carrier resin. Additionally, the phase change material tetradecane is able to adjust the temperature intelligently according to the change of external temperature to further improve the heat resistance of natural pigment.

The advantages of the present invention are as follows.

(1) The natural pigment is microencapsulated with polybutylene succinate as a wall material to improve its thermal stability and compatibility with carrier resin.

(2) The natural dye containing tetradecane is used as a core material. When the external temperature changes, tetradecane will undergo phase transformation, thereby reducing the influence of external temperature on plant extracts. The thermal stability of natural pigment is further improved by the intelligent temperature regulation function of tetradecane.

DETAILED DESCRIPTION OF THE EMBODIMENTS

The present invention will be further described in detail in combination with specific examples. It should be noted that these examples are only for the purpose of illustrating the present invention, rather than limiting the scope of the present invention in any manner.

Example 1

(1) Impurities are removed from rhubarb, then the rhubarb is cleaned, dried in the air, crushed into 80 mesh, and soaked in a tetradecane/ethanol mixed solvent for 1 h, in which the volume ratio of the tetradecane to the ethanol is 1:5. Subsequently, extraction is performed under a reflux at 60° C. for 2 h and followed by filtration. After repeatedly extracting for 3 times, the extracted solutions obtained from multiple times of extraction are combined to obtain a natural dye stock solution, and the ethanol is removed by decompression distillation to obtain a natural dye/tetradecane solution.

(2) 5 g polybutylene succinate is dissolved into 100 mL chloroform, the natural dye/tetradecane solution obtained in step (1) is added, stirred at a high speed, and mixed uniformly, in which the mass ratio of the natural dye/tetradecane solution to the polybutylene succinate is 3:1.

(3) 100 mL deionized water, Arabic gum and sodium dodecylbenzene sulfonate are added into a 250 mL three-port flask, fully stirred and dissolved, in which the mass ratio of the Arabic gum to the sodium dodecylbenzene sulfonate is 1:3, and the total mass of the Arabic gum and the sodium dodecylbenzene sulfonate accounts for 2% of the total mass of the system. The chloroform solution obtained in step (2) is added into the three-port flask, and the temperature is slowly raised to 40° C. Condensation is performed to recover steam, while keeping 40° C. for 6 h. With the evaporation of chloroform, polybutylene succinate gradually solidifies to form microcapsules. The solids are collected, fully cleaned with deionized water and dried to obtain natural dye/tetradecane microcapsules.

(4) 10 parts by weight of the natural dye/tetradecane microcapsules, 0.5 parts by weight of antioxidant 1010 and 89.5 parts by weight of carrier resin ethylene terephthalate are added to a high-speed mixer with a rotation speed of 500 rpm, and mixed at 150° C. for 30 min. The well-mixed material is added into a twin-screw extruder for melt blending, extrusion and granulation, in which screw temperatures are set as follows: 200° C. in a first zone, 230° C. in a second zone, 220° C. in a third zone, 230° C. in a fourth zone, 240° C. in a fifth zone and 230° C. in a sixth zone. After cooling with 25° C. water, pelletizing is performed, followed by drying at 80° C.

Comparative Example 1

(1) Impurities are removed from rhubarb, then the rhubarb is cleaned, dried in the air, crushed into 80 mesh, and soaked in a tetradecane/ethanol mixed solvent for 1 h, in which the volume ratio of the tetradecane to the ethanol is 1:5. Subsequently, extraction is performed under a reflux at 60° C. for 2 h and followed by filtration. After repeatedly extracting for 3 times, the extracted solutions obtained from multiple times of extraction are combined to obtain a natural dye stock solution, and the ethanol is removed by decompression distillation to obtain a natural dye/tetradecane solution.

(2) 10 parts by weight of the natural dye/tetradecane solution, 0.5 parts by weight of antioxidant 1010 and 89.5 parts by weight of carrier resin ethylene terephthalate are added to a high-speed mixer with a rotation speed of 500 rpm, and mixed at 150° C. for 30 min. The well-mixed material is added into a twin-screw extruder for melt blending, extrusion and granulation, in which screw temperatures are set as follows: 200° C. in a first zone, 230° C. in a second zone, 220° C. in a third zone, 230° C. in a fourth zone, 240° C. in a fifth zone and 230° C. in a sixth zone. After cooling with 25° C. water, pelletiz is performed, followed by drying at 80° C.

Comparative Example 2

(1) Impurities are removed from rhubarb, then the rhubarb is cleaned, dried in the air, crushed into 80 mesh, and soaked in an ethanol solution for 1 h. Subsequently, extraction is performed under a reflux at 60° C. for 2 h and followed by filtration. After repeatedly extracting for 3 times, the extracted solutions obtained from multiple times of extraction are combined to obtain a natural dye stock solution, and concentrated by decompression distillation to obtain a natural dye solution.

(2) 5 g polybutylene succinate is dissolved into 100 mL chloroform, the natural dye solution obtained in step (1) is added, stirred at a high speed, and mixed uniformly, in which the mass ratio of the natural dye solution to the polybutylene succinate is 3:1.

(3) 100 mL deionized water, Arabic gum and sodium dodecylbenzene sulfonate are added into a 250 mL three-port flask, fully stirred and dissolved, in which the mass ratio of the Arabic gum to the sodium dodecylbenzene sulfonate is 1:3, and the total mass of the Arabic gum and the sodium dodecylbenzene sulfonate accounts for 2% of the total mass of the system. The chloroform solution obtained in step (2) is added into the three-port flask, and the temperature is slowly raised to 40° C. Condensation is performed to recover steam, while keeping at 40° C. for 6 h. With the evaporation of chloroform, polybutylene succinate gradually solidifies to form microcapsules. The solids are collected, fully cleaned with deionized water and dried to obtain natural dye microcapsules.

(4) 10 parts by weight of the natural dye microcapsules, 0.5 parts by weight of antioxidant 1010 and 89.5 parts by weight of carrier resin ethylene terephthalate are added to a high-speed mixer with a rotation speed of 500 rpm, and mixed at 150° C. for 30 min. The well-mixed material is added into a twin-screw extruder for melt blending, extrusion and granulation, in which screw temperatures are set as follows: 200° C. in a first zone, 230° C. in a second zone, 220° C. in a third zone, 230° C. in a fourth zone, 240° C. in a fifth zone and 230° C. in a sixth zone. After cooling with 25° C. water, pelletizing is performed, followed by drying at 80° C.

Comparative Example 3

(1) Impurities are removed from rhubarb, then the rhubarb is cleaned, dried in the air, crushed into 80 mesh, and soaked in an ethanol solution for 1 h. Subsequently, extraction is performed under a reflux at 60° C. for 2 h and followed by filtration. After repeatedly extracting for 3 times, the extracted solutions obtained from multiple times of extraction are combined to obtain a natural dye stock solution, and concentrated by decompression distillation to obtain a natural dye solution.

(2) 5 g polybutylene succinate is dissolved into 100 mL chloroform, the natural dye solution obtained in step (1) is added, stirred at a high speed, and mixed uniformly, in which the mass ratio of the natural dye solution to the polybutylene succinate is 3:1.

(3) 100 mL deionized water, Arabic gum and sodium dodecylbenzene sulfonate are added into a 250 mL three-port flask, fully stirred and dissolved, in which the mass ratio of the Arabic gum to the sodium dodecylbenzene sulfonate is 1:3, and the total mass of the Arabic gum and the sodium dodecylbenzene sulfonate accounts for 2% of the total mass of the system. The chloroform solution obtained in step (2) is added into the three-port flask, and the temperature is slowly raised to 40° C. Condensation is performed to recover steam, while keeping at 40° C. for 6 h. With the evaporation of chloroform, polybutylene succinate gradually solidifies to form microcapsules. The solids are collected, fully cleaned with deionized water and dried to obtain natural dye microcapsules.

(4) 10 parts by weight of the natural dye microcapsules, 5 parts by weight of tetradecane, 0.5 parts by weight of antioxidant 1010 and 84.5% carrier resin ethylene terephthalate are added to a high-speed mixer with a rotation speed of 500 rpm, and mixed at 150° C. for 30 min. The well-mixed material is added into a twin-screw extruder for melt blending, extrusion and granulation, in which screw temperatures are set as follows: 200° C. in a first zone, 230° C. in a second zone, 220° C. in a third zone, 230° C. in a fourth zone, 240° C. in a fifth zone and 230° C. in a sixth zone. After cooling with 25° C. water, pelletizing is performed, followed by drying at 80° C.

Comparative Example 4

(1) Impurities are removed from rhubarb, then the rhubarb is cleaned, dried in the air, crushed into 80 mesh, and soaked in a tetradecane/ethanol mixed solvent for 1 h, in which the volume ratio of the tetradecane to the ethanol is 1:5. Subsequently, extraction is performed under a reflux at 60° C. for 2 h and followed by filtration. After repeatedly extracting for 3 times, the extracted solutions obtained from multiple times of extraction are combined to obtain a natural dye stock solution, and the ethanol is removed by decompression distillation to obtain a natural dye/tetradecane solution.

(2) Sodium dodecylbenzene sulfonate is added into the natural dye solution obtained in step (1), stirred and dissolved, and emulsified for 30 min for later use, in which the mass of the sodium dodecylbenzene sulfonate accounts for 2% of the total mass of the system.

(3) Tripolycyanamide and a formaldehyde solution are successively poured into a three-port flask with the molar ratio of 1:2.5, and the pH value is adjusted to 8-9 with triethanolamine under stirring at the speed of 500 rpm. While heating to 70° C., a reaction lasts until the tripolycyanamide is completely dissolved, followed by diluting with distilled water double the volume of formaldehyde to obtain a transparent tripolycyanamide-formaldehyde prepolymer aqueous solution for standby.

(4) The tripolycyanamide-formaldehyde prepolymer obtained in step (3) is added dropwise into the natural dye emulsion obtained in step (2) at a water bath temperature of 50° C. and kept at this temperature for 1 h under mechanically stirring at 250 r/min. Then the temperature is raised to 85° C. for reaction for 2 h, then the pH is adjusted to 7-8 to terminate the reaction, to obtain natural dye microcapsules.

(5) 10 parts by weight of the natural dye microcapsules, 0.5 parts by weight of antioxidant 1010 and 89.5 parts by weight of carrier resin ethylene terephthalate are added to a high-speed mixer with a rotation speed of 500 rpm, and mixed at 150° C. for 30 min. The well-mixed material is added into a twin-screw extruder for melt blending, extrusion and granulation, in which screw temperatures are set as follows: 200° C. in a first zone, 230° C. in a second zone, 220° C. in a third zone, 230° C. in a fourth zone, 240° C. in a fifth zone and 230° C. in a sixth zone. After cooling with 25° C. water, pelletizing is performed, followed by drying at 80° C.

Comparative Example 5

(1) Impurities are removed from rhubarb, then the rhubarb is cleaned, dried in the air, crushed into 80 mesh, and soaked in an ethanol solution for 1 h. Subsequently, extraction is performed under a reflux at 60° C. for 2 h and followed by filtration. After repeatedly extracting for 3 times, the extracted solutions obtained from multiple times of extraction are combined to obtain a natural dye stock solution, tetradecane is added into the natural dye solution, and the ethanol is removed by decompression distillation to obtain a natural dye/tetradecane solution, in which the volume ratio of the tetradecane to the natural dye solution is 1:5.

(2) 5 g polybutylene succinate is dissolved into 100 mL chloroform, the natural dye/tetradecane solution obtained in step (1) is added, stirred at a high speed, and mixed uniformly, in which the mass ratio of the natural dye/tetradecane solution to the polybutylene succinate is 3:1.

(3) 100 mL deionized water, Arabic gum and sodium dodecylbenzene sulfonate are added into a 250 mL three-port flask, fully stirred and dissolved, in which the mass ratio of the Arabic gum to the sodium dodecylbenzene sulfonate is 1:3, and the total mass of the Arabic gum and the sodium dodecylbenzene sulfonate accounts for 2% of the total mass of the system. The chloroform solution obtained in step (2) is added into the three-port flask, and the temperature is slowly raised to 40° C. Condensation is performed to recover steam, while keeping at 40° C. for 6 h. With the evaporation of chloroform, polybutylene succinate gradually solidifies to form microcapsules. The solids are collected, fully cleaned with deionized water and dried to obtain natural dye/tetradecane microcapsules.

(4) 10 parts by weight of the natural dye/tetradecane microcapsules, 0.5 parts by weight of antioxidant 1010 and 89.5 parts by weight of carrier resin ethylene terephthalate are added to a high-speed mixer with a rotation speed of 500 rpm, and mixed at 150° C. for 30 min. The well-mixed material is added into a twin-screw extruder for melt blending, extrusion and granulation, in which screw temperatures are set as follows: 200° C. in a first zone, 230° C. in a second zone, 220° C. in a third zone, 230° C. in a fourth zone, 240° C. in a fifth zone and 230° C. in a sixth zone. After cooling with 25° C. water, pelletizing is performed, followed by drying at 80° C.

Example 2

(1) Impurities are removed from turmeric, then the turmeric is cleaned, dried in the air, crushed into 200 mesh, and soaked in a tetradecane/ethanol mixed solvent for 2 h, in which the volume ratio of the tetradecane to the ethanol is 2:5. Subsequently, extraction is performed under a reflux at 100° C. for 0.5 h and followed by filtration. After repeatedly extracting for 5 times, the extracted solutions obtained from multiple times of extraction are combined to obtain a natural dye stock solution, and the ethanol is removed by decompression distillation to obtain a natural dye/tetradecane solution.

(2) 10 g polybutylene succinate is dissolved into 100 mL chloroform, the natural dye/tetradecane solution obtained in step (1) is added, stirred at a high speed, and mixed uniformly, in which the mass ratio of the natural dye/tetradecane solution to the polybutylene succinate is 5:1.

(3) 100 mL deionized water, Arabic gum and sodium dodecylbenzene sulfonate are added into a 250 mL three-port flask, fully stirred and dissolved, in which the mass ratio of the Arabic gum to the sodium dodecylbenzene sulfonate is 1:6, and the total mass of the Arabic gum and the sodium dodecylbenzene sulfonate accounts for 4% of the total mass of the system. The chloroform solution obtained in step (2) is added into the three-port flask, and the temperature is slowly raised to 50° C. Condensation is performed to recover steam, while keeping at 50° C. for 4 h. With the evaporation of chloroform, polybutylene succinate gradually solidifies to form microcapsules. The solids are collected, fully cleaned with deionized water and dried to obtain natural dye/tetradecane microcapsules.

(4) 25 parts by weight of the natural dye/tetradecane microcapsules, 1.5 parts by weight of antioxidant 1010 and 73.5 parts by weight of carrier resin ethylene terephthalate are added to a high-speed mixer with a rotation speed of 1,500 rpm, and mixed at 180° C. for 10 min. The well-mixed material is added into a twin-screw extruder for melt blending, extrusion and granulation, in which screw temperatures are set as follows: 250° C. in a first zone, 255° C. in a second zone, 260° C. in a third zone, 260° C. in a fourth zone, 260° C. in a fifth zone and 260° C. in a sixth zone. After cooling with 30° C. water, pelletizing is performed, followed by drying at 100° C.

Example 3

(1) Impurities are removed from red pepper, then the red pepper is cleaned, dried in the air, crushed into 150 mesh, and soaked in a tetradecane/ethanol mixed solvent for 1.5 h, in which the volume ratio of the tetradecane to the ethanol is 1.5:5. Subsequently, extraction is performed under a reflux at 80° C. for 1 h and followed by filtration. After repeatedly extracting for 4 times, the extracted solutions obtained from multiple times of extraction are combined to obtain a natural dye stock solution, and the ethanol is removed by decompression distillation to obtain a natural dye/tetradecane solution.

(2) 8 g polybutylene succinate is dissolved into 100 mL chloroform, the natural dye/tetradecane solution obtained in step (1) is added, stirred at a high speed, and mixed uniformly, in which the mass ratio of the natural dye/tetradecane solution to the polybutylene succinate is 4:1.

(3) 100 mL deionized water, Arabic gum and sodium dodecylbenzene sulfonate are added into a 250 mL three-port flask, fully stirred and dissolved, in which the mass ratio of the Arabic gum to the sodium dodecylbenzene sulfonate is 1:4, and the total mass of the Arabic gum and the sodium dodecylbenzene sulfonate accounts for 3% of the total mass of the system. The chloroform solution obtained in step (2) is added into the three-port flask, and the temperature is slowly raised to 45° C. Condensation is performed to recover steam, while keeping at 45° C. for 5 h. With the evaporation of chloroform, polybutylene succinate gradually solidifies to form microcapsules. The solids are collected, fully cleaned with deionized water and dried to obtain natural dye/tetradecane microcapsules.

(4) 15 parts by weight of the natural dye/tetradecane microcapsules, 1.0 part by weight of antioxidant 1010 and 84 parts by weight of carrier resin ethylene terephthalate are added to a high-speed mixer with a rotation speed of 1,000 rpm, and mixed at 160° C. for 20 min. The well-mixed material is added into a twin-screw extruder for melt blending, extrusion and granulation, in which screw temperatures are set as follows: 240° C. in a first zone, 245° C. in a second zone, 250° C. in a third zone, 250° C. in a fourth zone, 250° C. in a fifth zone and 250° C. in a sixth zone. After cooling with 28° C. water, pelletizing is performed, followed by drying at 90° C.

Example 4

(1) Impurities are removed from madder, then the madder is cleaned, dried in the air, crushed into 100 mesh, and soaked in a tetradecane/ethanol mixed solvent for 1.2 h, in which the volume ratio of the tetradecane to the ethanol is 1.2:5. Extraction is performed under a reflux at 70° C. for 1.5 h and followed by filtration. After repeatedly extracting for 3 times, the extracted solutions obtained from multiple times of extraction are combined to obtain a natural dye stock solution, and the ethanol is removed by decompression distillation to obtain a natural dye/tetradecane solution.

(2) 6 g polybutylene succinate is dissolved into 100 ml, chloroform, the natural dye/tetradecane solution obtained in step (1) is added, stirred at a high speed, and mixed uniformly, in which the mass ratio of the natural dye/tetradecane solution to the polybutylene succinate is 3.5:1.

(3) 100 mL deionized water, Arabic gum and sodium dodecylbenzene sulfonate are added into a 250 mL three-port flask, fully stirred and dissolved, in which the mass ratio of the Arabic gum to the sodium dodecylbenzene sulfonate is 1:5, and the total mass of the Arabic gum and the sodium dodecylbenzene sulfonate accounts for 3.5% of the total mass of the system, The chloroform solution Obtained in step (2) is added into the three-port flask, and the temperature is slowly raised to 48° C. Condensation is performed to recover steam, while keeping at 48° C. for 5.5 h. With the evaporation of chloroform, polybutylene succinate gradually solidifies to form microcapsules. The solids are collected, fully cleaned with deionized water and dried to obtain natural dye/tetradecane microcapsules.

(4) 20 parts by weight of the natural dye/tetradecane microcapsules, 1.2 parts by weight of antioxidant 1010 and 78.8 parts by weight of carrier resin ethylene terephthalate are added to a high-speed mixer with a rotation speed of 1,200 rpm, and mixed at 170° C. for 25 min. The well-mixed material is added into a twin-screw extruder for melt blending, extrusion and granulation, in which screw temperatures are set as follows: 230° C. in a first zone, 255° C. in a second zone, 245° C. in a third zone, 245° C. in a fourth zone, 250° C. in a fifth zone and 250° C. in a sixth zone. After cooling with 26° C. water, pelletizing is performed, followed by drying at 85° C.

Example 5

The color masterbatch with natural dye is spun with fiber-grade semi-dull polyethylene terephthalate (PET) chips (the amount of color masterbatch is 15% of the total mass of raw materials), and then woven into a garter to measure the color. According to the ISO105X11 Standard method, after the garter is subjected to hot-pressing at 200° C. for 60 s, the color is measured to obtain ΔE, discoloration and staining grade. The higher the discoloration rating, the better the temperature resistance of color masterbatch; the higher the staining rating, the better the color fastness to migration.

Determination of Color Uniformity

After dyeing, the K/S value at the maximum absorption wavelength is determined at any 8 points of the same fabric, and the standard deviation S is calculated as follows:

$$S = \sqrt{\frac{\sum_{i=1}^{n}\left[\frac{(K/S)_i}{\frac{1}{n}\sum_{i=1}^{n}(K/S)_i} - 1\right]^2}{n-1}}$$

Where, n is the number of measurement points.

The smaller the S value is, the better the color uniformity is.

Example 6

The natural dye/tetradecane microcapsules obtained in example 1 are spun with fiber-grade semi-dull PET chips (the amount of natural dye/tetradecane microcapsules is 15% of the total mass of raw materials), and then woven into a garter to measure the color.

TABLE 1

Color fastness to hot pressing of garter woven after spinning with color masterbatch with natural dye ISO105X11 Hot-pressing at 200° C. for 60 s

|  | K/S | S | Discoloration rating/grade | Staining rating/grade |
| --- | --- | --- | --- | --- |
| Example 1 | 14.5 | 0.105 | 4 | 4-5 |
| Comparative example 1 | 8.2 | 0.532 | 1-2 | 2 |
| Comparative example 2 | 10.6 | 0.109 | 1-2 | 2 |
| Comparative example 3 | 12.3 | 0.113 | 2 | 2-3 |
| Comparative example 4 | 10.0 | 0.587 | 2 | 2 |
| Comparative example 5 | 11.1 | 0.110 | 2 | 2-3 |
| Example 2 | 12.4 | 0.113 | 4 | 4 |
| Example 3 | 13.6 | 0.108 | 4-5 | 4 |
| Example 4 | 9.3 | 0.121 | 4 | 4-5 |
| Example 6 | 12.6 | 0.368 | 2-3 | 3 |

Table 1 shows that the color fastness to hot pressing of garter woven after spinning with the color masterbatch with natural dye of the present invention is excellent. The color fastness to hot pressing of garter woven with the color masterbatch without microencapsulation obtained in comparative example 1 is poor. The experimental data of comparative example 2 shows that the addition of phase change material is conducive to the improvement of the color fastness to hot pressing of the color masterbatch with natural dye. Although tetradecane is added in comparative example 3, it is not microencapsulated. During the process of melt blending, extrusion and granulation, tetradecane will migrate and volatilize, resulting in a reduced content of tetradecane in the final masterbatch, which will cause the color fastness to hot pressing of the garter woven with the final color masterbatch after spinning to be inferior to that of Example 1. The wall material used in comparative example 4 is tripolycyanamide-formaldehyde resin, which has poor compatibility with carrier resin, resulting in the color fastness to hot pressing of the garter woven with the final color masterbatch after spinning to be also inferior to that of Example 1. Tetradecane is not added during the process of natural dye extraction in comparative example 5, therefore, the extraction rate of natural dye is relatively low, and the color of garter is lighter than that of example 1. The natural dye/tetradecane microcapsules are directly spun with fiber-grade semi-dull PET chips in example 6, the compatibility of the microcapsules and PET is not as good as that in example 1, therefore, the color uniformity of the woven garter is substantially poor.

What is claimed is:

1. A method for preparing a color masterbatch with a natural dye, comprising: taking a mixed solvent of a phase change material tetradecane and ethanol to extract the natural dye, taking polybutylene succinate as a wall material to microencapsulate the natural dye containing the phase change material by a solvent evaporation method to obtain natural dye/tetradecane microcapsules, then melt-blending the natural dye/tetradecane microcapsules with a carrier resin to obtain a mixed product. extruding and granulating the mixed product to obtain the color masterbatch with the natural dye.

2. The method for preparing the color masterbatch with the natural dye according to claim 1, wherein the method comprises the following specific steps:

(1) removing impurities of a natural plant raw material, cleaning, drying the natural plant raw material in the air to obtain a cleaned natural plant raw material. crushing the cleaned natural plant raw material into 80-200 mesh to obtain a natural plant powder, and soaking the natural plant powder in the mixed solvent of the phase change material tetradecane and the ethanol for 1-2 h to obtain a first mixture, extracting under a reflux and filtering the first mixture, extracting the first mixture 3-5 times repeatedly to obtain extracted solutions, combining the extracted solutions obtained from multiple times of extraction to obtain a. natural dye stock solution; removing the ethanol by decompression distillation to obtain a tetradecane-containing natural dye solution;

(2) dissolving the polybutylene succinate into 100 mL chloroform, adding the tetradecane-containing natural dye solution obtained in step (1) to obtain a second mixture, stirring the second mixture at a predetermined speed, and mixing the second mixture uniformly to obtain a chloroform solution of the polybutylene succinate containing the natural dye;

(3) adding 100 mL deionized water, Arabic gum and sodium dodecylbenzene sulfonate into a 250 mL three-port flask to obtain a third mixture, fully stirring and dissolving the third mixture;

adding the chloroform solution of the polybutylene succinate containing the natural dye obtained in step (2) into the three-port flask to obtain a fourth mixture. slowly raising a temperature of the fourth mixture to 40-50° C., condensing and recovering steam of the fourth mixture, keeping at the temperature of 40-50° C. for 4-6 h, forming microcapsules by a gradual solidification of the polybutylene succinate caused by an evaporation of the chloroform, collecting solids, fully cleaning with deionized water and drying the solids to obtain natural dye/tetradecane microcapsules; and (4) adding 10-25 parts by weight of the natural dye/tetradecane microcapsules, 0.5-1.5 parts by weight of an antioxidant and 70-90 parts by weight of a carrier resin to a high-speed mixer for a mixing to obtain a well-mixed material, and adding the well-mixed material into a twin-screw extruder for a melt blending, an extrusion and agranulation to obtain a resulting product; after cooling the resulting product with 25-30° C. water, pelletizing and drying the resulting product at 80-100° C. to obtain the color masterbatch with the natural dye.

3. The method for preparing the color masterbatch with the natural dye according to claim 2, wherein the natural plant raw material in step (1) is one selected from the group consisting of rhubarb, turmeric, red pepper, camphor leaves, madder, and vervain, and a volume ratio of the tetradecane to the ethanol is 1:5-2:5.

4. The method for preparing the color masterbatch with the natural dye according to claim 2, wherein in step (1), a temperature of the reflux is 60-100° C., and a time of the reflux is 0.5-2 h.

5. The method for preparing the color masterbatch with the natural dye according to claim 2, wherein in step (2), a mass ratio of the tetradecane-containing natural dye solution to the polybutylene succinate is 3:1-5:1.

6. The method for preparing the color masterbatch with the natural dye according to claim 2, wherein in step (3), a mass ratio of the Arabic gum and the sodium dodecylbenzene sulfonate is 1:3-1:6, and a total mass of the Arabic gum and the sodium dodecylbenzene sulfonate accounts for 2%-4% of a total mass of the third mixture.

7. The method for preparing the color masterbatch with the natural dye according to claim 2, wherein in step (4), the antioxidant is antioxidant 1010, and the carrier resin is ethylene terephthalate.

8. The method for preparing the color masterbatch with the natural dye according to claim 2, wherein in step (4), a rotation speed of the high-speed mixer is 500-1,500 rpm, a temperature of the mixing is 150-180° C., and a time of the mixing is 10-30 min.

9. The method for preparing the color masterbatch with the natural dye according to claim 2, wherein in step (4), screw temperatures of the extrusion and the granulation are set as follows: 200-250° C. in a first zone, 230-255° C. in a second zone, 220-260° C. in a third zone, 220-260° C. in a fourth zone, 220-260° C. in a fifth zone and 220-260° C. in a sixth zone.

* * * * *